(12) United States Patent
Yamazaki

(10) Patent No.: US 8,137,191 B2
(45) Date of Patent: Mar. 20, 2012

(54) GAME DEVICE, MESSAGE DISPLAY METHOD, INFORMATION RECORDING MEDIUM AND PROGRAM

(75) Inventor: Yukihiro Yamazaki, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 426 days.

(21) Appl. No.: 12/446,049

(22) PCT Filed: Oct. 5, 2007

(86) PCT No.: PCT/JP2007/069578
§ 371 (c)(1), (2), (4) Date: Apr. 17, 2009

(87) PCT Pub. No.: WO2008/047621
PCT Pub. Date: Apr. 24, 2008

(65) Prior Publication Data
US 2010/0298048 A1 Nov. 25, 2010

(30) Foreign Application Priority Data
Oct. 18, 2006 (JP) .................. 2006-283451

(51) Int. Cl.
*A63F 13/00* (2006.01)
*A63F 13/10* (2006.01)
*G06F 17/00* (2006.01)
(52) U.S. Cl. ....................................... 463/31
(58) Field of Classification Search .......... 463/8, 9, 463/30, 31
See application file for complete search history.

(56) References Cited

U.S. PATENT DOCUMENTS
2002/0035467 A1  3/2002  Morimoto et al.

FOREIGN PATENT DOCUMENTS
| EP | 1865457 A1 | 12/2007 |
| GB | 2415392 A | 12/2005 |
| JP | 2001-312744 | 11/2001 |
| JP | 2002099376 A | 4/2002 |
| JP | 2003-103054 | 4/2003 |
| JP | 2003-108506 | 4/2003 |

(Continued)

OTHER PUBLICATIONS

Stout, W. Brian, "Smart Moves: Intelligent Path-Finding", Feb. 12, 1999, Retrieved from the Internet: URL:http://gamasutra.com/features/19990212/sm_01.htm, 15 pages.

(Continued)

*Primary Examiner* — Evan Pert
(74) *Attorney, Agent, or Firm* — Howard & Howard Attorneys PLLC

(57) ABSTRACT

A message acquiring unit (230) acquires a message from data received by a communication unit (210), i.e., acquires a message sent from another character. A decay rate calculating unit (260) senses the gap between the player character and another character and calculates the decay rate of the message sent from another character. A message display control unit (270) displays the message sent from another character by converting a part of the message to one or more masking characters based on the decay rate. That is, the message display control unit (270) determines the number of masking characters in accordance with the decay rate calculated by the decay rate calculating unit (260) and the number of letters in the message, and appropriately selects the determined number of letters from the message and substitutes masking characters for the selected letters.

7 Claims, 17 Drawing Sheets

FOREIGN PATENT DOCUMENTS

| | | |
|---|---|---|
| JP | 2003-164669 | 6/2003 |
| JP | 3424822 B | 7/2003 |
| JP | 2004-128614 | 4/2004 |
| JP | 2004/128614 | 4/2004 |
| JP | 2004-267433 | 9/2004 |
| JP | 2006-277094 | 10/2006 |
| JP | 2006277094 A | 10/2006 |
| TW | 515993 | 1/2003 |
| TW | I312696 | 8/2009 |
| WO | 2006/000786 A1 | 1/2006 |
| WO | WO 2006/093145 A1 | 9/2006 |
| WO | WO 2006/103843 A1 | 10/2006 |

OTHER PUBLICATIONS

Supplementary European Search Report of Aug. 12, 2009 for Application No. EP07829316, 8 pages.

International Search Report PCT/JP2007/069578 mailed Nov. 6, 2007.

Taiwanese Office Action with Search Report along with the English Translation of same, Jan. 2011.

Fig. 8C

(expressed in 20 letters in Japanese writing)

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|

WHY DOESN'T SOMEBODY WANT TO ATTACK WEST DUNGEON WITH ME?

Fig. 8D

(expressed in 20 letters in Japanese writing)

| . | . | 3 | 4 | . | . | . | 8 | . | . | 11 | 12 | . | 14 | . | 16 | . | . | 19 | . |
|---|---|---|---|---|---|---|---|---|---|---|---|---|---|---|---|---|---|---|---|

WHY . . ESN'T . . . WA . . TO ATTA . . GEO . WITH ME?

GAME DEVICE, MESSAGE DISPLAY METHOD, INFORMATION RECORDING MEDIUM AND PROGRAM

TECHNICAL FIELD

The present invention relates to a game device, a method of displaying a message, an information recording medium, and a program that provide ease of grasping a range wherein a chat is feasible, in displaying messages exchanged by the chat.

BACKGROUND ART

Conventionally, the use of techniques for communication between terminals connected with each other via the Internet or other networks have been common. One example of the common techniques is a chat (text chatting). Chatting is mutual messaging that can be done by a plurality of users connecting to a server via the Internet by using their personal computers.

In the chat of this sort, for example, when a user sends a message by his/her own personal computer, the message is on the display of the personal computer of a counterpart of the chat.

On the other hand, the chat has become possible between game devices or the like in network games (online games), in which the game devices connect to a game server via the Internet. A player can, for example, freely move his/her player character (the character controlled by the player) disposed in a virtual space, chat with other characters (characters controlled by other players) nearby, and exchange information for progressing the game.

In such a network game, chat content is displayed in such a representation that the characters themselves are chatting in the game field. Therefore, the players can enjoy the game, feeling as if they themselves were in the virtual space.

For the network game (game device), a technique of determining an appropriate display font size for each message to improve the visibility of the game screen has also been disclosed (see e.g., Patent Literature 1).

Patent Literature 1: Japanese Patent No. 3424822 (pp. 4-7, FIG. 2)

DISCLOSURE OF INVENTION

In such conventional network games as described above, in general, the range in which chatting is feasible is defined based on whether a linear distance between characters is not larger than a prescribed one. Therefore, in some cases the chat becomes unnatural.

For example, if the distance between characters is barely within the range wherein a chat is feasible, the chat can be done normally but becomes completely unfeasible when either character moves only a bit to come out of the chat-feasible range. Therefore, when the characters are away from each other by a certain distance, the only possible move of the characters for the players to keep the chat is either no move or moves in such directions that the characters get closer.

This is because of the boundary of the range wherein the chat is feasible, on which the existing statuses of feasibility of chat are only feasible or infeasible, these feasibility statuses moreover switching in a moment, causing the impossibility of player to recognize the boundary of the chat-feasible range.

Furthermore, even in a seemingly chat-infeasible situation where e.g. an obstacle (geographical object, building object, etc.) intervenes between the characters, chatting can normally be done if they are within a certain distance.

As shown in FIG. 11A, for example, even in a case where a player character Jc is outside a building B and another character Tc being a chat counterpart is in the building B, they can chat as long as they are within a certain distance, and chatting is feasible normally, as shown in FIG. 11B.

A possible remedy to the defect is to separately determine the feasibility of chatting based on whether an object can be seen from the character (whether the situation is that an object is visible from the player's viewpoint), even if the object is within a certain distance from the character. That is, in the situation shown in FIG. 11A, chatting is prohibited because the player character Jc cannot see another character Tc (likewise, the another character Tc cannot see the player character Jc), for example.

Yet, such a chat feasibility determination based on whether one character is visible from another could result in other inconvenience in a different situation.

For example, in a situation as shown in FIG. 11C that the player character Jc and another character Tc cannot see each other because of a corner of a wall W, it would be not natural if chatting is made infeasible.

To fundamentally remedy such a defect, it is possible to change the display font size like the invention described in Patent Literature 1 identified above, in accordance with the distance between the characters and the presence or absence of an obstacle or the like. For example, the display font size may be made smaller as the distance between the characters becomes larger.

However, as concerns portable game devices, changing the display font size might not be appropriate, in the first place. That is, with the display font size made smaller than a standard, the text may become substantially unidentifiable (it is completely impossible to grasp the content of the message). On the other hand, it is possible to set a display font size that is larger than a standard as the normal display font size, with instead using the standard display font size as the reduced font size. However, due to the limitation of the display area, the number of letters that can be displayed becomes noticeably fewer in such a normal situation in which the display font size larger than the standard is used.

Hence, there has been a demand for a technique that makes it possible to grasp the range wherein a chat is feasible without changing the display font size.

The present invention was made to solve such a problem and an object of the present invention is to provide a game device, a method of displaying message, an information recording medium, and a program that provide ease of grasping a range wherein a chat is feasible, in displaying messages exchanged by the chat.

Means for Solving the Problem

A game device according to a first aspect of the present invention is a game device that displays messages exchanged between a plurality of characters disposed in a common virtual space and including a player character operated by a player. The game device includes an acquiring unit, a calculating unit, and a display control unit.

First, the acquiring unit acquires a letter string of a message uttered by another character. For example, the acquiring unit acquires a letter string of a message uttered by the another character to the player character or to still another character (including a letter string of a message uttered to a nearby area, not addressed to a particular character). The calculating unit calculates a decay rate (attenuation rate) of the message between the another character, which has uttered the letter string of a message, and the player character, based on the positional relationship between the characters (for example, the distance between them in consideration of any obstacle, etc.). Then, the display control unit displays the letter string of the message uttered by the another character by converting a part of the letter string of the message to one or more masking characters (turned letters) based on the calculated decay rate.

That is, it is not that, at the boundary of the range wherein a chat is feasible, a chat is made either feasible or infeasible, but that the message is displayed with some part of it turned based on the decay rate that accords to the distance (distance in consideration of obstacles), etc. between the another character and the player character. Hence, the boundary of the range wherein a chat is feasible can have some expanse by the presence/absence of masking characters in the message, the ratio of the masking characters, etc.

As a result, it is possible to provide ease of grasping a sense of range about a range wherein a chat is feasible, in displaying messages exchanged during a chat.

The game device described above may further include a path searching unit that searches out a transmission path between the another character and the player character, the transmission pass bypassing an obstacle that exists between the another character and the player character, and a distance measuring unit that measures a distance between the characters that is weighted in accordance with the portion at which the searched-out transmission path bypasses the obstacle. The calculating unit may calculate the decay rate based on the distance between the characters measured by the distance measuring unit.

In this case, the decay rate is calculated based not only on the presence or absence of an obstacle between the another character and the player character, but on the length of the transmission path that is weighted for the transmission path to bypass the obstacle. Therefore, a decay rate that is more realistic can be obtained and the number of letters to be converted to masking characters in the message, etc. can be more suitable.

The display control unit may change the ratio of masking characters in the letter string of a message acquired by the acquiring unit, based on the decay rate calculated by the calculating unit.

In this case, the decay rate can be calculated in accordance with the positional relationship between the another character and the player character, and the ratio of masking characters in the message can be more suitable in correspondence with this decay rate.

The game device described above may further include a letter number determining unit that determines a number of masking characters, in accordance with the decay rate calculated by the calculating unit and a number of letters included in the message acquired by the acquiring unit, and a letter converting unit that converts the determined number of letters selected at random from the letter string of the message, to one or more masking characters. The display control unit may display the letter string resulting from the conversion to masking characters by the letter converting unit.

In this case, since the letters to be converted to the masking characters are selected at random, a message can be displayed in various patterns, even if the positional relationship between another character and the player character is the same.

The game device described above may further include a forbidden word determining unit that determines the presence or absence of a predetermined forbidden word in the letter string resulting from the conversion to one or more masking characters by the letter converting unit. The display control unit may re-perform the conversion to one or more masking characters, when the forbidden word determining unit determines that there is a forbidden word.

In this case, since those words whose use is prohibited in broadcasting, a discriminatory word, or the like is not to be displayed, and it is therefore possible to prevent the player from feeling offended.

A method of displaying message in accordance with a second aspect of the present invention is a method of displaying message for a game device that displays messages exchanged between a plurality of characters being disposed in a common virtual space and including a player character operated by a player. The method includes an acquiring step, a calculating step, and a display controlling step.

First, at the acquiring step, a letter string of a message uttered by another character is acquired. For example, a letter string of a message uttered by another character to the player character or to still another character is acquired. At the calculating step, based on the positional relationship between another character, which has uttered the letter string of a message, and the player character (for example, based on the distance between them in consideration of any obstacle, etc.), the decay rate of the message between the characters is calculated. Then, at the display controlling step, the letter string of a message is displayed on the game screen with a part of the letter string of the message converted to one or more masking characters based on the calculated decay rate.

That is, at the boundary of the range wherein a chat is feasible, the message is displayed with a part of it converted to one or more masking characters, based on the decay rate that accords to the distance (distance in consideration of an obstacle, etc.) between another character and the player character, not based on whether chatting is feasible or infeasible. Hence, the boundary of the range wherein a chat is feasible can have some expanse by the presence or absence of masking characters in the message, the ratio of the masking characters, etc.

As a result, it is possible to provide ease of grasping a sense of range about a range wherein a chat is feasible, in displaying messages exchanged during a chat.

An information recording medium according to a third aspect of the present invention stores a program that controls a computer (including an electronic device) to function as the game device described above.

A program according to a fourth aspect of the present invention controls a computer (including an electronic device) to function as the game device described above.

The program can be recorded on a computer-readable information recording medium such as a compact disk, a flexible disk, a hard disk, a magneto-optical disk, a digital video disk, a magnetic tape, a semiconductor memory, etc.

The program can be distributed or sold via a computer communication network independently from a computer on which the program is to be executed. The information recording medium can be distributed or sold independently from the computer.

Effect of the Invention

According to the present invention, it is possible to provide ease of grasping a sense of range about a range wherein a chat is feasible, in displaying messages exchanged during a chat.

BRIEF DESCRIPTION OF DRAWINGS

FIG. 8C is a diagram which is referred to in specifically explaining each procedure in the message display process.

FIG. 8D is a diagram which is referred to in specifically explaining each procedure in the message display process.

Figure 1:
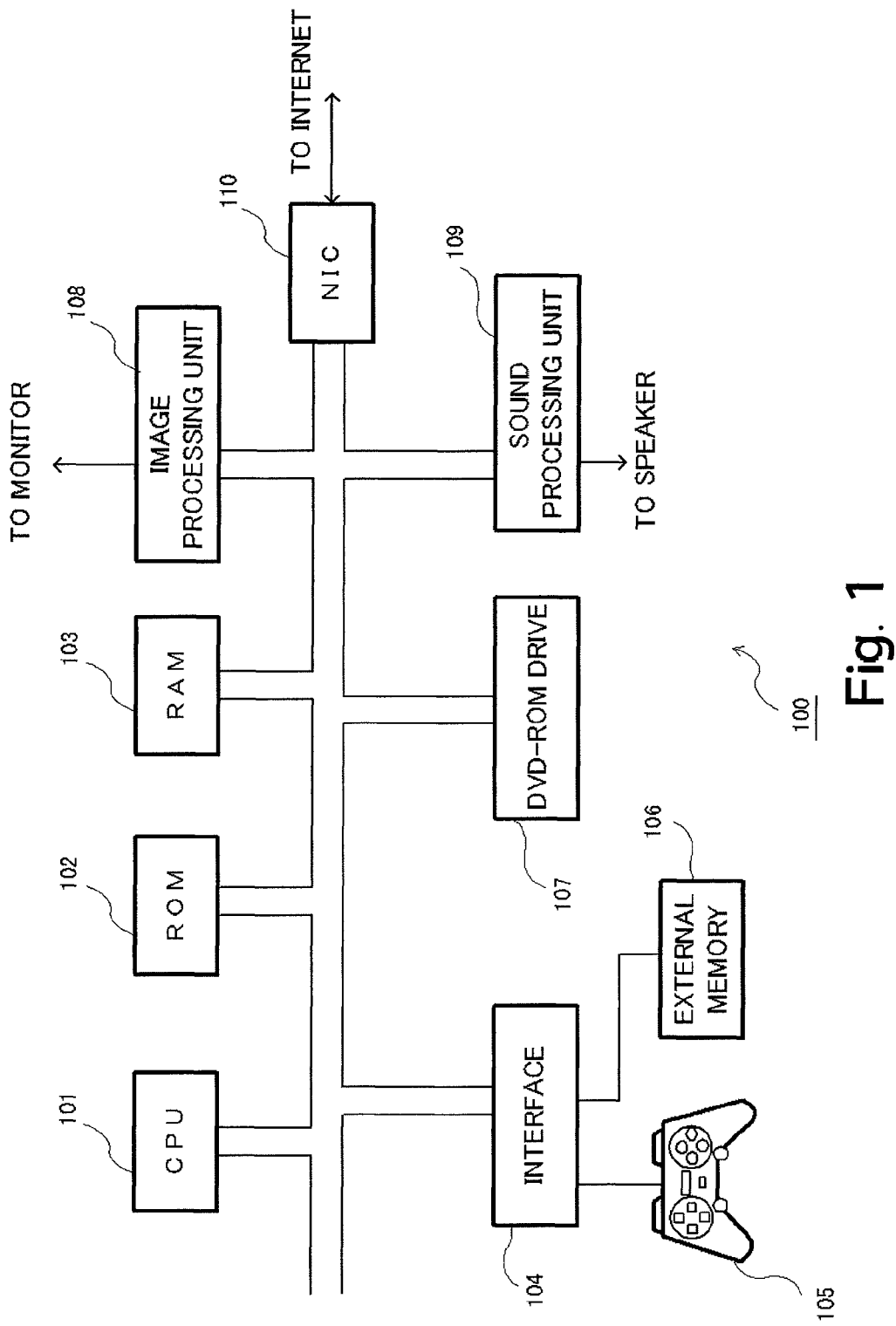
FIG. 1 is a block diagram showing a schematic configuration of a game device according to an embodiment of the present invention.

EXPLANATION OF REFERENCE NUMERALS 100 game device
101 CPU
102 ROM
103 RAM
104 interface
105 controller
106 external memory
107 DVD-ROM drive
108 image processing unit
109 sound processing unit
110 NIC
200 message display device
210 communication unit
220 operation unit
230 message acquiring unit
240 object storage unit
250 character position managing unit
260 decay rate calculating unit
270 message display control unit
280 image generating unit
290 dictionary data

BEST MODE FOR CARRYING OUT THE INVENTION

Embodiments of the present invention will be described below. For ease of understanding, the embodiments below of the present invention are described as applications to game devices. However, the present invention may be similarly applied to information processing devices, such as various computers, PDAs, or mobile phones. In other words, the embodiments described below are provided to give explanations, not to limit the scope of the present invention. Therefore, those skilled in the art can adopt embodiments in which some or all of the elements herein have been replaced with respective equivalents, and such embodiments are also to be included within the scope of the present invention.

(Embodiment 1)

FIG. 1 is a schematic diagram showing a schematic configuration of a typical game device by which a message display device according to an embodiment of the present invention is realized. The following explanation will be given with reference to FIG. 1.

A game device 100 includes a Central Processing Unit (CPU) 101, a Read Only Memory (ROM) 102, a Random Access Memory (RAM) 103, an interface 104, a controller 105, an external memory 106, a Digital Versatile Disk (DVD)-ROM drive 107, an image processing unit 108, a sound processing unit 109, and a Network Interface Card (NIC) 110.

When a DVD-ROM that stores a game program and data is inserted to the DVD-ROM drive 107 and the game device 100 is turned on, the program is executed and a message display device according to the present embodiment is realized.

The CPU 101 controls the entire operation of the game device 100, and is connected to each component to exchange control signals and data with it.

An Initial Program Loader (IPL), which is executed immediately after the power is turned on, is stored in the ROM 102, and when executed, makes a program stored on the DVD-ROM be read into the RAM 103 and executed by the CPU 101. Further, an operating system program and various data that are necessary for controlling the operation of the whole game device 100 are stored in the ROM 102.

The RAM 103 is a temporary memory for data and programs, and retains a program and data read out from the DVD-ROM and data necessary for game proceeding and chat communications.

The controller 105 connected via the interface 104 receives an operation input given by a user for playing a game. For example, the controller 105 receives an input of a letter string (message), etc. in response to an operation input.

The external memory 106 detachably connected via the interface 104 rewritably stores data representing a progress status of a game, log (record) data of chat communications, etc. As needed, a user can record such data into the external memory 106 by entering an instruction input via the controller 105.

A DVD-ROM to be mounted on the DVD-ROM drive 107 stores a program for realizing a game and image data and sound data that accompany the game. Under the control of the CPU 101, the DVD-ROM drive 107 performs a reading process to the DVD-ROM mounted thereon to read out a necessary program and data, which are to be temporarily stored in the RAM 103, etc.

The image processing unit 108 processes data read out from a DVD-ROM by means of the CPU 101 and an image calculation processor (unillustrated) possessed by the image processing unit 108, and records the processed data in a frame memory (unillustrated) possessed by the image processing unit 108. Image information recorded in the frame memory is converted to video signals at predetermined synchronization timings and outputed to a monitor (unillustrated) connected to the image processing unit 108. This enables various types of image display.

The image calculation processor can perform, at a high speed, overlay calculation of two-dimensional images, transparency calculation such as α blending, etc., and various saturation calculations.

The image calculation processor can perform a high-speed calculation of rendering polygon information that is disposed in a virtual three-dimensional space and affixed with various texture information by Z buffering and obtaining a rendered image of the polygon disposed in the virtual three-dimensional space from a predetermined view position.

Furthermore, the CPU 101 and the image calculation processor can work in cooperation to depict a string of letters as a two-dimensional image in the frame memory or on a surface of a polygon in accordance with font information that defines the shape of the letters. The font information is stored in the ROM 102, but dedicated font information stored in a DVD-ROM may be used.

The sound processing unit 109 converts sound data read out from a DVD-ROM into an analog sound signal and outputs it from a speaker (unillustrated) connected thereto. Further, under the control of the CPU 101, the sound processing unit 109 generates a sound effect or music data that shall be released in the progress of a game, and outputs a sound corresponding to the data from the speaker.

The NIC 110 connects the game device 100 to a computer communication network (unillustrated) such as the Internet, etc. The NIC 110 is constituted by a 10BASE-T/100BASE-T product used for building a Local Area Network (LAN), an analog modem, an Integrated Services Digital Network (ISDN) modem, or an Asymmetric Digital Subscriber Line (ADSL) modem for connecting to the Internet via a telephone line, a cable modem for connecting to the Internet via a cable television line, or the like, and an interface (unillustrated) that intermediates between any of these and the CPU 101.

The game device 100 may use a large capacity external storage device such a hard disk or the like and configure it to serve the same function as the ROM 102, the RAM 103, the external memory 106, a DVD-ROM mounted on the DVD-ROM drive 107, or the like.

It is also possible to employ an embodiment in which a keyboard for receiving an input for editing a text string from a user, a mouse for receiving a position designation or a selection input of various kinds from a user, etc. are connected.

An ordinary computer (general-purpose personal computer or the like) may be used instead of the game device 100 according to the present embodiment as the message display device. For example, an ordinary computer includes, likewise the game device 100 described above, a CPU a RAM, a ROM, a DVD-ROM drive, and an NIC, an image processing unit with simpler capabilities than those of the game device 100, and a hard disk as its external storage device with also compatibility with a flexible disk, a magneto-optical disk, a magnetic tape, etc. Such a computer uses a keyboard, a mouse, etc. instead of the controller 105 as its input device. When a game program is installed on the computer and executed, the computer functions as the message display device.

(Schematic Configuration of the Message Display Device)

Figure 2:
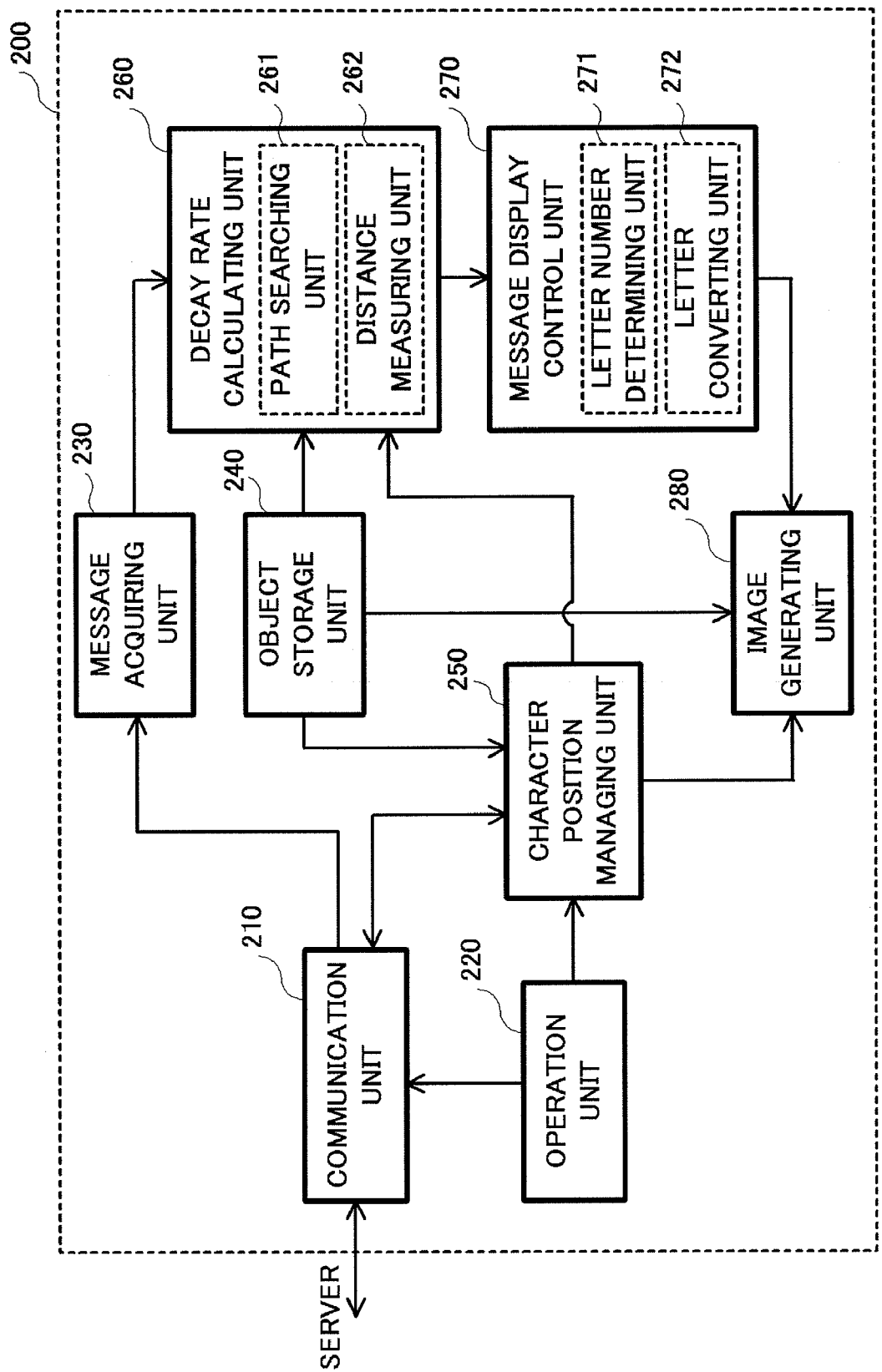
FIG. 2 is a block diagram showing a schematic configuration of a message display device according to an embodiment of the present invention.

FIG. 2 is a schematic diagram showing a schematic configuration of the message display device according to the present embodiment. As an example, the message display device is a device that displays messages (chat data) exchanged between characters, which may be a player character (character operated by a player) and another character (character operated by another player) that are disposed in a common virtual space. The following explanation will be given with reference to FIG. 2.

The message display device 200 includes a communication unit 210, an operation unit 220, a message acquiring unit 230, an object storage unit 240, a character position managing unit 250, a decay rate calculating unit 260, a message display control unit 270, and an image generating unit 280.

The communication unit 210 connects to a server (game server or the like) via a network such as the Internet, and sends and receives various data.

For example, the communication unit 210 sends information representing the position of the player character managed by the character position managing unit 250, a message input by the player from the operation unit 220, etc. to the server.

The communication unit 210 receives information representing the position of the another character, a message (chat data) from the another character (another player), etc. that are sent from the server. The communication unit 210 supplies the received position information of another character to the character position managing unit 250, and supplies the received message to the message acquiring unit 230.

The NIC 110 can function as such a communication unit 210.

The operation unit 220 receives information representing an instruction to the player character, a message addressed to another character to chat with, in response to an operation by the player. That is, the operation unit 220 receives an instruction to move or an instruction to act in some way addressed to the player character in the virtual space, and receives a message from the player addressed to another player.

The controller 105 can function as such an operation unit 220.

The message acquiring unit 230 acquires a message from data received by the communication unit 210. That is, the message acquiring unit 230 acquires a message sent from another character (for example, a message addressed to the player character or addressed to still another character).

The message acquiring unit 230 also acquires a message input by the player (a message addressed to another character). At this time, the message acquiring unit 230 may directly acquire a message input from the operation unit 220, or may acquire a message that is echoed back from the server.

The CPU 101 can function as such a message acquiring unit 230.

The object storage unit 240 stores information regarding characters and other objects disposed in a virtual space.

For example, the object storage unit 240 stores information regarding character objects such as the player character, other characters, etc., and other objects such as fixed objects (geography, buildings, walls, etc.) that are disposed in a field or the like.

It is assumed that the object storage unit 240 also stores information representing positions in the virtual space of, for example, fixed objects, whose position in the virtual space does not change.

The RAM 103 can store as such an object storage unit 240.

The character position managing unit 250 manages position information (current position, etc.) of objects such as the player character and other characters, whose position in the virtual space changes. For example, since the player character changes its position in the virtual space in accordance with an instruction to move received via the operation unit 220, the character position managing unit 250 manages position information of the player character. Likewise, since another character changes its position in the virtual space in response to an operation of the another player (to be more specific, in response to position information of the another character sent from the server), the character position managing unit 250 manages the position information of the another character.

The RAM 103 and the CPU 101 can function as such a character position managing unit 250.

The decay rate calculating unit 260 senses the gap between the player character and another character, and calculates the rate of decay of a message sent from another character.

For example, the decay rate calculating unit 260 includes a path searching unit 261 and a distance measuring unit 262. When the message acquiring unit 230 acquires a message sent from another character, the path searching unit 261 first searches out the shortest transmission path that leads from the player character to the another character. In a case where there is an obstacle in between, the path searching unit 261 searches out a transmission path that runs off (goes around) the obstacle. Then, the distance measuring unit 262 measures the length of the searched-out transmission path. That is, the decay rate calculating unit 260 calculates the decay rate based on the length of the transmission path.

Figure 3A:
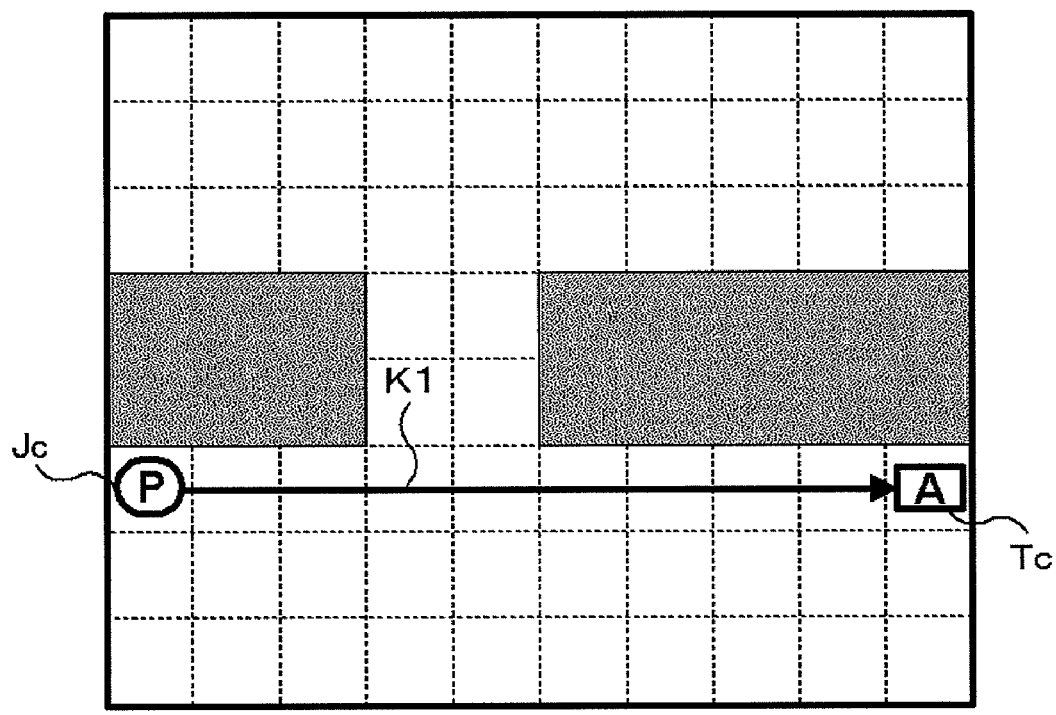
FIG. 3A is a diagram for explaining a transmission path that leads from a character to a character.
Figure 3B:
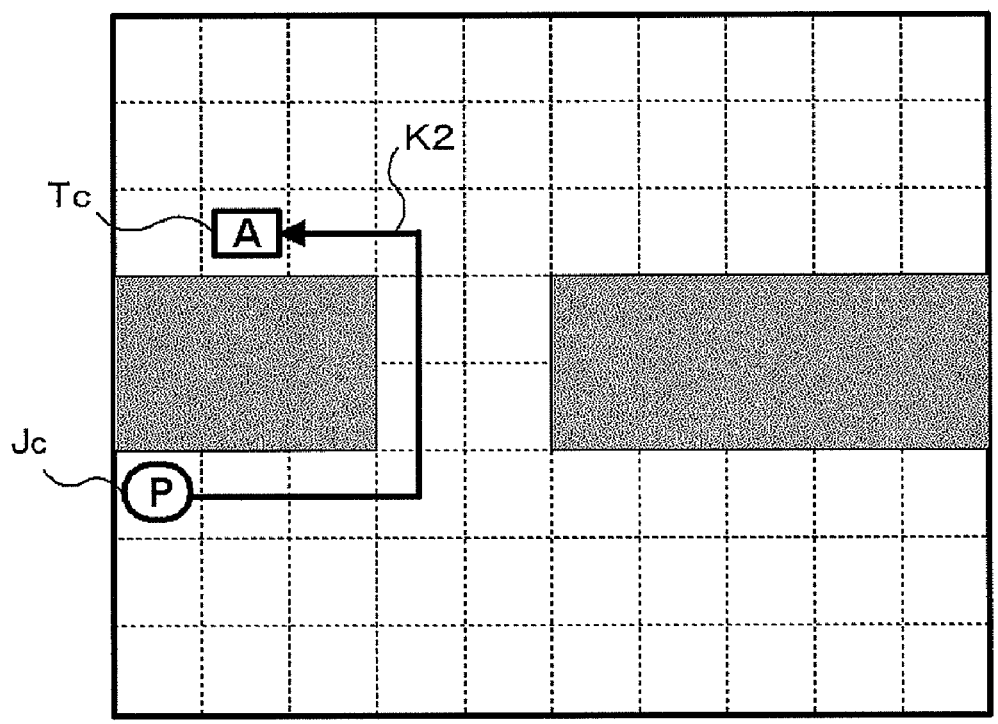
FIG. 3B is a diagram for explaining a transmission path that leads from player character to another character.

To be more specific, an example case will now be explained, in which the map of a virtual space is managed as latticed grid as shown in FIGS. 3A and 3B. To facilitate the understanding of the explanation, the explanation will be given by means of a two-dimensional (planar) map. However, in the case of a three-dimensional (cubic) map, a steric transmission path will be searched out in a like manner.

The path searching unit 261 searches out a shortest linear transmission path K1, in a case where there is no obstacle between the player character Jc and another character Tc as shown in FIG. 3A. On the other hand, in a case where there is an obstacle between the characters, i.e., in the case shown in FIG. 3B, the path searching unit 261 searches out a shortest transmission path K2 that bypasses the obstacle. The distance measuring unit 262 measures the length of the transmission path K1 or the transmission path K2 searched out in this manner. Then, the decay rate calculating unit 260 calculates a decay rate that accords to the length of the transmission path.

Figure 3C:
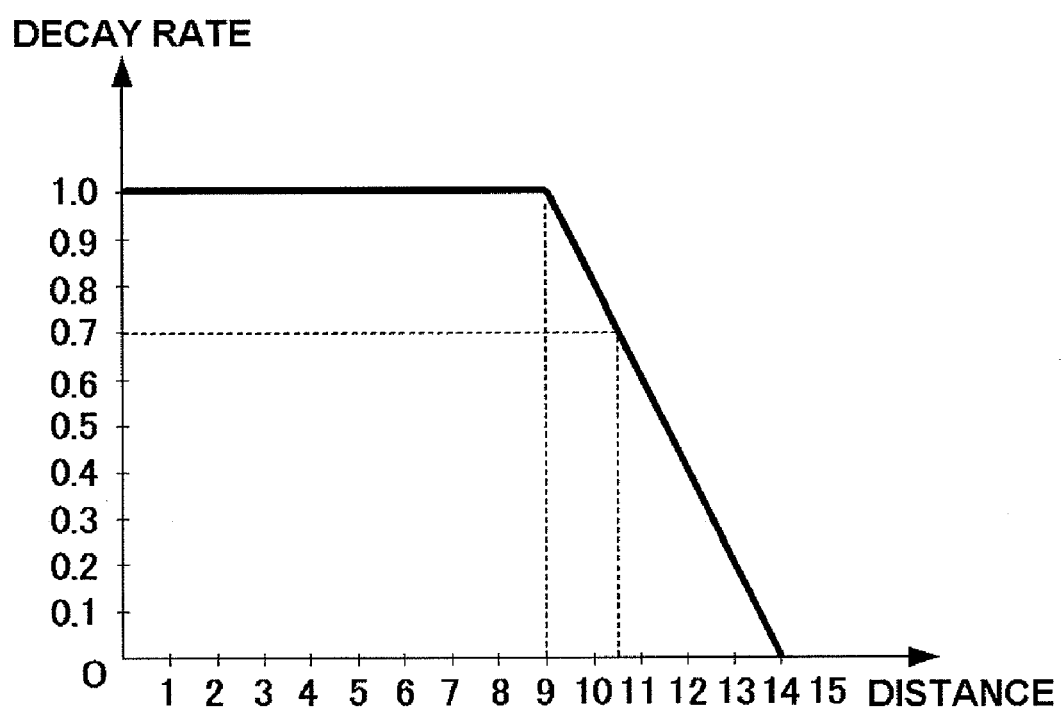
FIG. 3C is a graph showing an example relationship between the length of a transmission path and the decay rate.

As an example, the decay rate calculating unit 260 derives the decay rate that accords to the length according to a graph shown in FIG. 3C that indicates the relationship between length and decay rate.

The length of the transmission path is calculated with an appropriate weight put on a bend portion (a portion at which the path bends to get around the obstacle).

That is, when measuring the length of the transmission path K1 shown in FIG. 3A, the distance measuring unit 262 measures straightforward the length to be 9 (amounting from 9 grid squares) because there is no bent in the path. On the other hand, when measuring the length of the transmission path K2 shown in FIG. 3B where there are two bent portions, the distance measuring unit 262 measures the length to be 10.5 from "3+(3×1.5)+(2×1.5)", provided that each bent shall be weighted with multiplication by 1.5.

Then, the decay rate calculating unit 260 calculates the decay rate of the transmission path K1 (length 9) to be 1.0 (no decay), while calculating the decay rate of the transmission path K2 (length 10.5) to be 0.7 (a 30% decay), by, for example, referring to the graph of FIG. 3C.

It is possible to make application to a virtual space map not managed in the form of a grid.

Figure 4A:
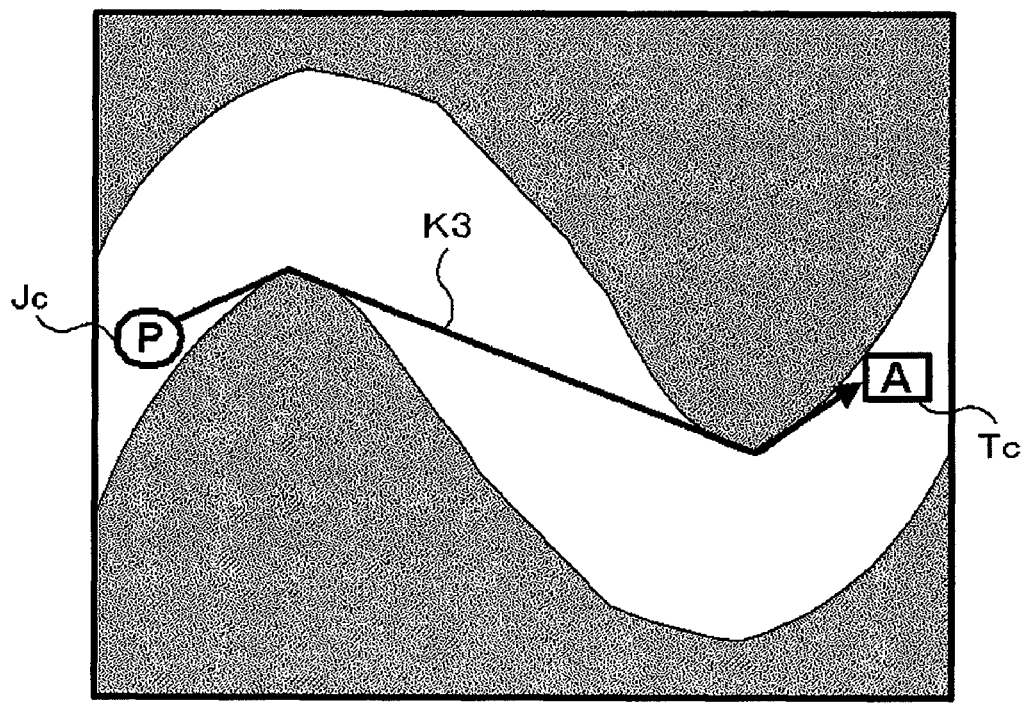
FIG. 4A is a diagram for explaining another transmission path that leads from player character to another character.

For example, in the case of a free-form map as shown in FIG. 4A not managed in the form of a grid, the path searching unit 261 searches out a shortest transmission path K3 that leads from the player character Jc to another character Tc by bypassing the obstacle. In such a free-form map, the length of the transmission path K3 is calculated with a weight determined in accordance with the angle of a bend portion.

Figure 4B:
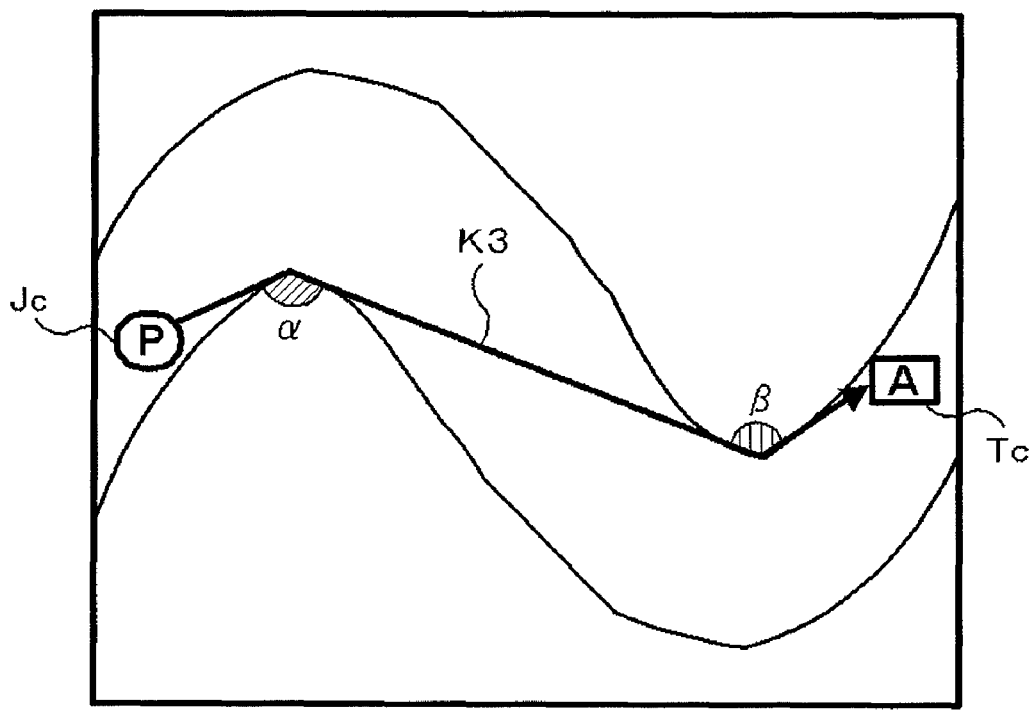
FIG. 4B is a diagram for explaining the another transmission path that leads from player character to another character.

As an example, the distance measuring unit 262 puts weights that accords to the angles (angle α and angle β) of the bend portions as shown in FIG. 4B, and calculates the length of the transmission path K3. Then, the decay rate calculating unit 260 calculates the decay rate of the transmission path K3 based on a graph as shown in FIG. 3C mentioned above.

Returning to FIG. 2, the decay rate calculating unit 260 supplies the decay rate of the transmission path obtained in this manner to the message display control unit 270.

The CPU 101 functions as such a decay rate calculating unit 260.

The message display control unit 270 displays a message sent from the another character by converting the message text partially to masking characters (turned letters) based on the decay rate.

Specifically, the message display control unit 270 includes a letter number determining unit 271 and a letter converting unit 272. The letter number determining unit 271 first determines the number of masking characters in accordance with the relationship between the decay rate calculated by the decay rate calculating unit 260 and the number of letters in the sent message. For example, in a case where the calculated decay rate is 0.7 and the number of letters in the received message is 10, the letter number determining unit 271 determines the number of masking characters to 3 from "10−(10× 0.7)".

Then, the letter converting unit 272 appropriately selects the determined number of letters from the message, and converts the selected letters to masking characters (substitutes masking characters for the selected letters). The letter converting unit 272 may select letters at random from the message or may regularly select letters in accordance with a predetermined logic.

Figure 5A:
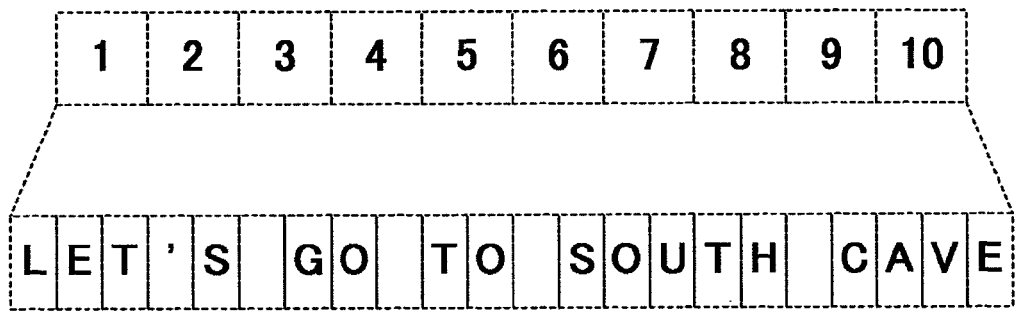
FIG. 5A is a diagram showing an example message sent.
Figure 5B:
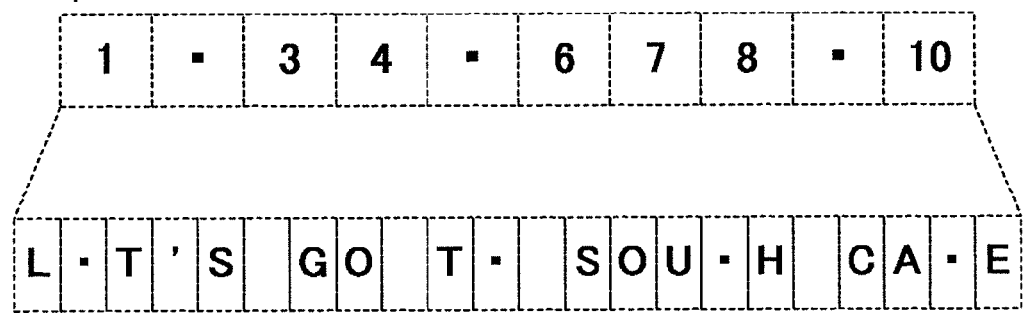
FIG. 5B is a diagram showing an example message that is partially substituted for by masking characters.
Figure 5C:
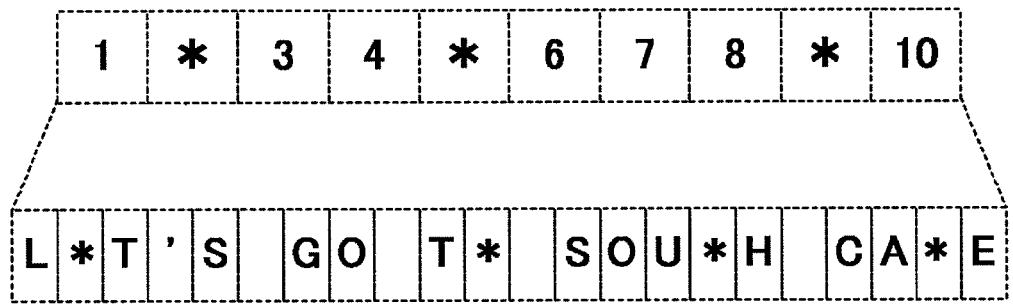
FIG. 5C is a diagram showing an example message that is partially substituted for by masking characters.
Figure 5D:
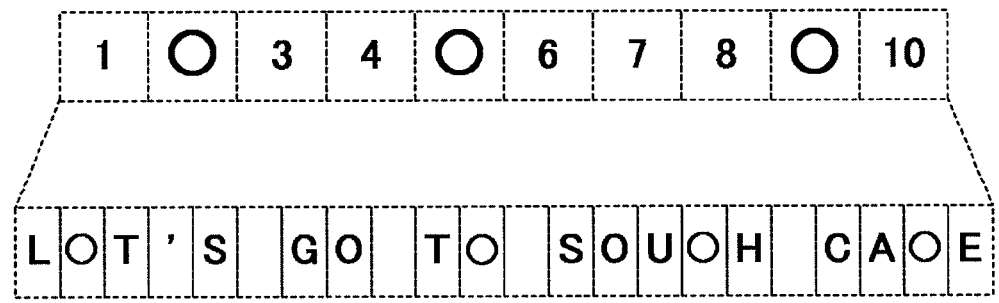
FIG. 5D is a diagram showing an example message that is partially substituted for by masking characters.

That is, for example, the letter number determining unit 271 selects at random three letters from a 10-letter message shown in FIG. 5A, and the letter converting unit 272 converts each selected letter to masking characters as shown in FIG. 5B. In this manner, the message display control unit 270 displays a message, in which some of the letters have been converted to masking characters. The form of masking characters is not limited to this but arbitrary. For other examples, masking characters having the forms shown in FIG. 5C and FIG. 5D may be used to convert and display a message.

The CPU 101 and the image processing unit 108 can function as such a message display control unit 270.

Referring back to FIG. 2, the image generating unit 280 generates a game image based on the information stored (and managed) by the object storage unit 240 and the character position managing unit 250. For example, the image generating unit 280 disposes objects such as fixed objects, etc. stored in the object storage unit 240 at predetermined positions in a virtual space, and disposes objects such as the player character and other characters stored in the object storage unit 240 at current positions managed by the character position managing unit 250. Then, the image generating unit 280 performs perspective transformation on each object from a predetermined view point, removes hidden surfaces, performs texture mapping, etc. and thereby generates a display game image.

A message generated by the message display control unit 270 is combined with and displayed together with the display game image.

Figure 6A:
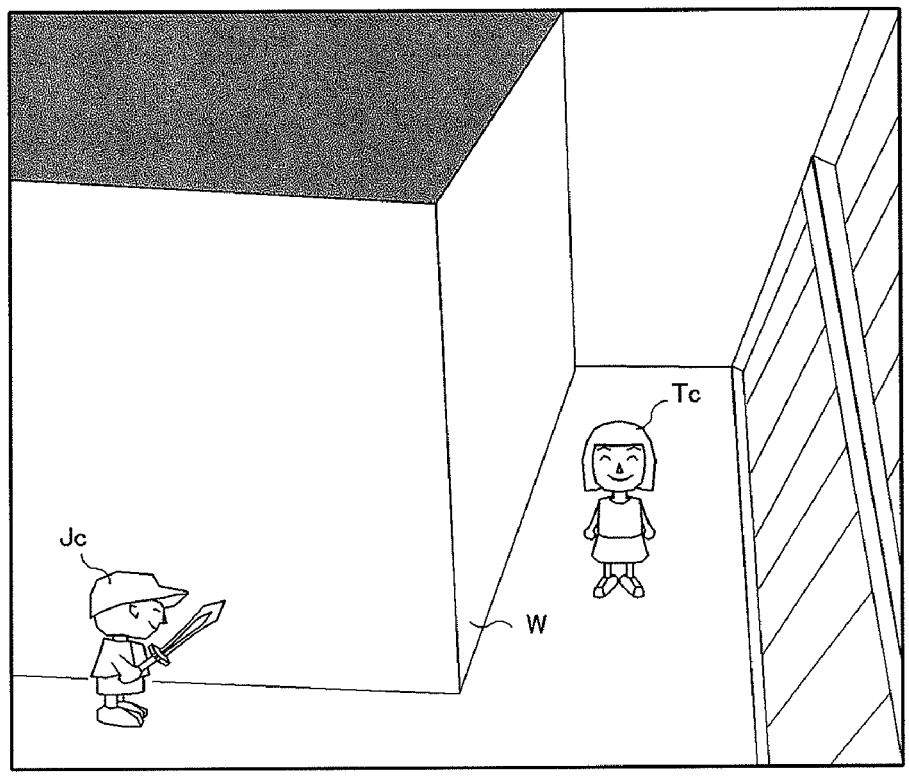
FIG. 6A is a diagram showing an example disposition of characters in a virtual space.
Figure 6B:
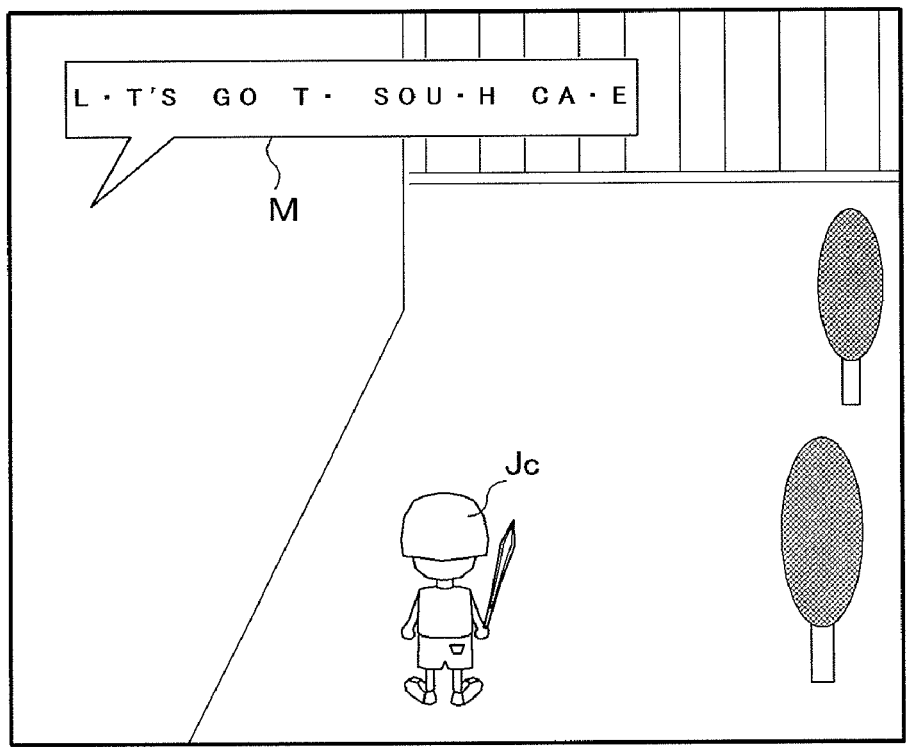
FIG. 6B is a diagram showing an example game screen.

As an example, as shown in FIG. 6A, in a case where the player character Jc and another character Tc are disposed in the virtual space at positions at which they cannot see each other because of a corner of a wall W, when a message is sent from the another character Tc, the image generating unit 280 generates a game image that includes the message M from the another character Tc as shown in FIG. 6B.

The game image of FIG. 6B is an example diagram whose view point is set at a predetermined point behind and above the player character Jc.

Further, FIG. 6B shows an example in which the message is displayed in a speech balloon. The method of displaying chat messages is not limited to this but arbitrary. For example, a display region used exclusively for chatting may be disposed separately and a message may be displayed in the region.

The image processing unit 108 can function as such an image generating unit 280.

(Overview of the Operation of the Message Display Device)

Figure 7:
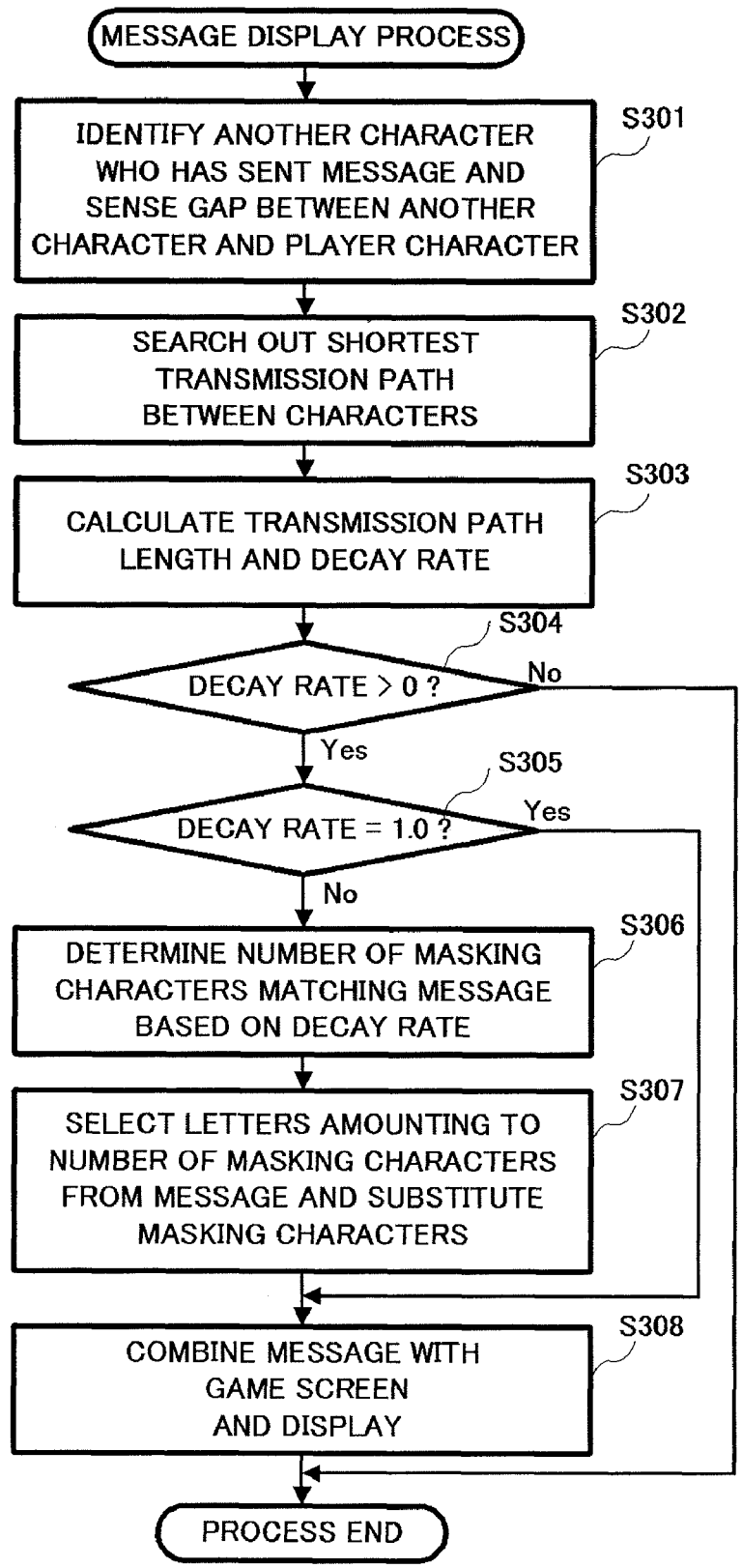
FIG. 7 is a flowchart showing an example message display process according to an embodiment of the present invention.

FIG. 7 is a flowchart showing the flow of a message display process performed by the message display device 200 having the configuration described above. The operation of the message display device 200 will now be explained below with reference to FIG. 7. While a predetermined game in which a player character, other characters, etc. appear is run, this message display process is performed repetitively when a chat message is sent from another character (another player).

First, upon acquiring a message, the message display device 200 identifies another character that has sent the message, and senses the gap between the player character and the another character (step S301). That is, the message display device 200 acquires the disposition of the fixed objects, the player character, and the another character based on the information stored (and managed) by the object storage unit 240 and the character position managing unit 250.

Figure 8A:
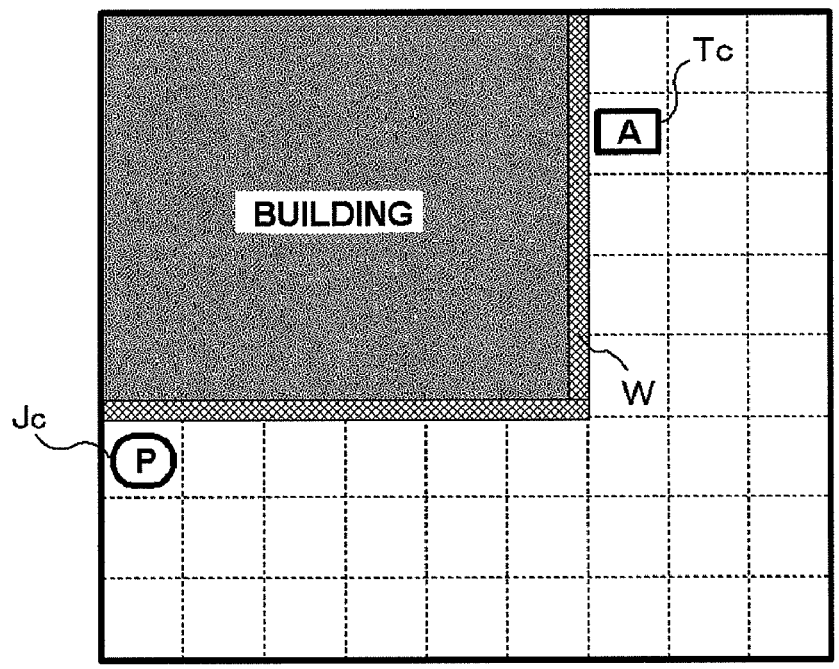
FIG. 8A is a diagram which is referred to in specifically explaining each procedure in the message display process.

For example, the message display device 200 acquires the disposition of the fixed objects such as a building, a wall W, etc., and the player character Jc, and the another character Tc as shown in FIG. 8A. As an example, a case in which the virtual space map is managed as a latticed grid will be explained below. Furthermore, for facilitating the understanding, a plan view of the three-dimensional virtual space seen from above is shown.

The message display device 200 searches for the shortest transmission path between the characters (step S302).

Figure 8B:
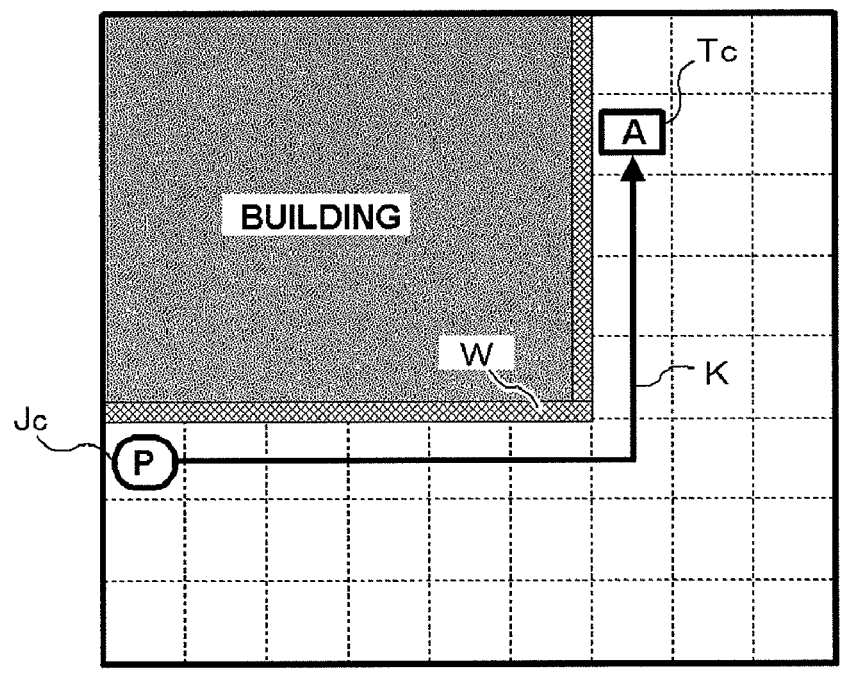
FIG. 8B is a diagram which is referred to in specifically explaining each procedure in the message display process.

For example, the message display device 200 searches out the shortest transmission path K that leads from the player character Jc to another character Tc as shown in FIG. 8B.

The message display device 200 calculates the length of the searched-out transmission path and calculates the decay rate (step S303).

Specifically, the message display device 200 first calculates the transmission path by taking into consideration the bend portion. For example, the length of the transmission path K shown in FIG. 8B is 12, from "6+(4×1.5)", provided that each bend portion is weighted with multiplication by 1.5.

Then, the message display device 200 calculates the decay rate in accordance with the length of the transmission path K. For example, in a case where the decay rate shall be determined in accordance with the graph shown in FIG. 3C mentioned above, the decay rate for the length 12 is 0.4 (a 60% decay).

The message display device 200 determines whether the calculated decay rate is higher than 0 or not (step S304). That is, the message display device 200 determines whether the characters are too distant from each other to chat.

When determined that the decay rate is not higher than 0 (the decay rate is 0) (step S304; No), the message display device 200 displays no message, and terminates the message display process.

On the other hand, when determined that the decay rate is higher than 0 (step S304; Yes), the message display device 200 determines whether the decay rate is 1.0 (no decay) or not (step S305). That is, the message display device 200 determines whether the distance (transmission distance) between the characters is short enough for them to chat normally.

When determined that the decay rate is 1.0 (step S305; Yes), the message display device 200 advances the flow to step S308, which will be described later.

On the other hand, when determined that the decay rate is not 1.0 (lower than 1.0) (step S305; No), the message display device 200 determines the number of masking characters that correspond to the message, in accordance with the decay rate (step S306).

For example, in a case where the decay rate is 0.4 and the number of letters in the message is 20, the number of masking characters is 12, from "20−(20×0.4)".

The message display device 200 selects the determined number of letters from the message, and substitutes masking characters for the selected letters (step S307).

Specifically, in a case where a message including 20 letters as shown in FIG. 8C is sent from another character Tc, the message display device 200 selects twelve letters from the message, for example, at random. Then, the message display device 200 substitutes masking characters for the selected letters as shown in FIG. 8D.

The message display device 200 combines the message with a game image and displays the combined image (step S308).

Figure 8E:
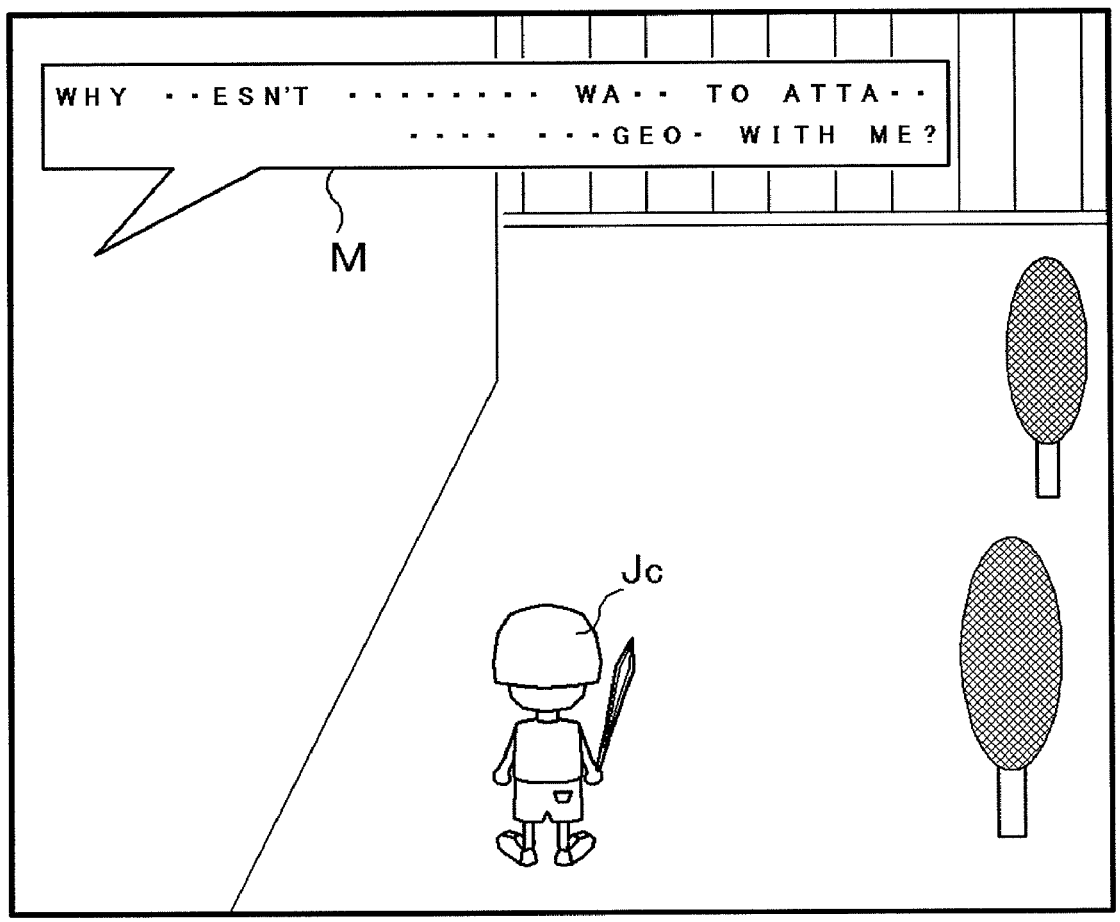
FIG. 8E is a diagram which is referred to in specifically explaining each procedure in the message display process.

For example, the message display device 200 displays a message M from another character Tc who cannot be seen as hidden behind an obstacle (a wall or the like) in the game screen, as shown in FIG. 8E.

Therefore, the player can recognize the presence of a character which is not in sight as hidden behind the obstacle but can be a chat counterpart, and can sense how much degree this character is out of the range wherein a chat is feasible, by taking into consideration the masking characters included in the message and the ratio of the masking characters, etc.

This message display process is performed repetitively at predetermined regular timings while the message is being acquired. Therefore, for example, when either or both of the player character Jc and another character Tc move(s) from the state shown in FIG. 8B and the length of the transmission path K between the characters changes, the decay rate increases or decreases and the ratio of masking characters in the message changes in accordance with the movement.

Figure 9A:
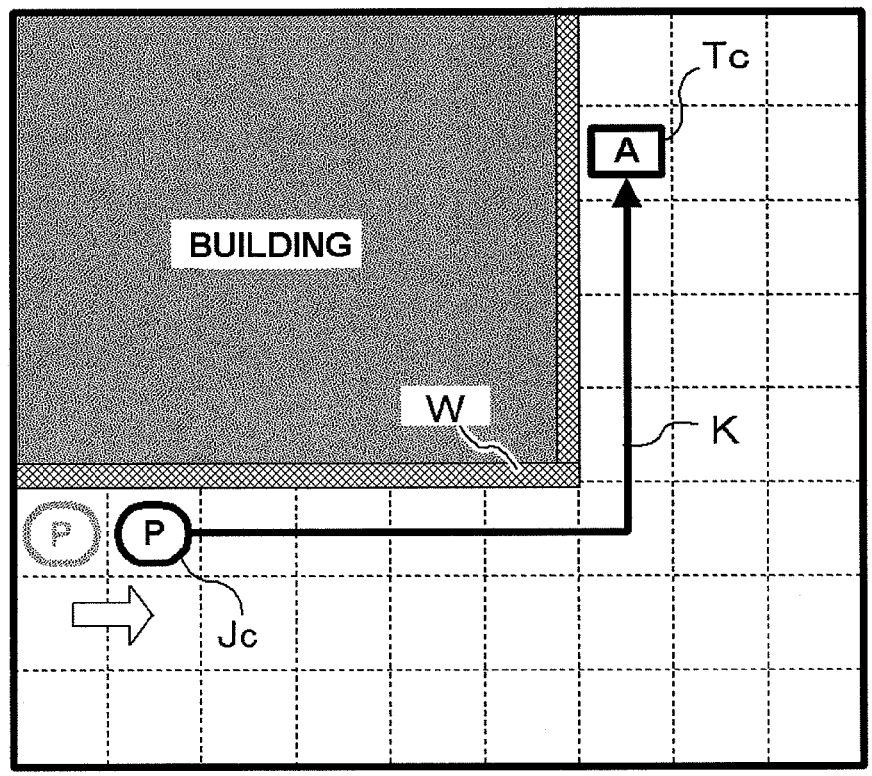
FIG. 9A is a diagram showing an example of a move of a player character and a displayed message accompanied thereby.
Figure 9B:
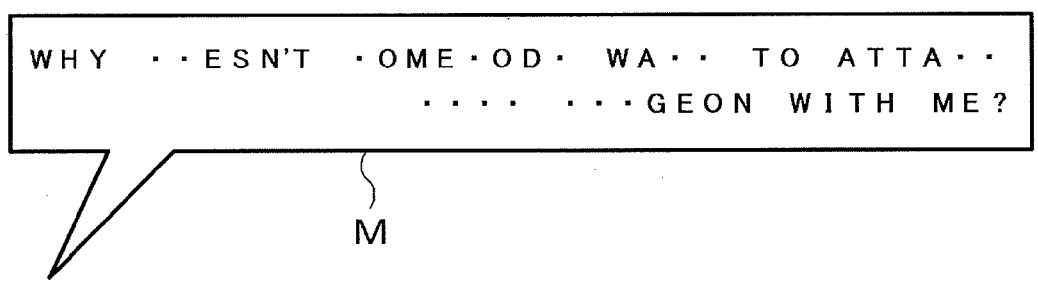
FIG. 9B is a diagram showing an example of a move of a player character and a displayed message accompanied thereby.

For example, as shown in FIG. 9A, when the player character Jc moves forward, the transmission path K shortens to a length 11, and the decay rate increases to 0.6 (a 40% decay). Accordingly, the number of masking characters decreases to 8, and as shown in FIG. 9B, the content of the displayed message M gradually becomes apparent.

Figure 9C:
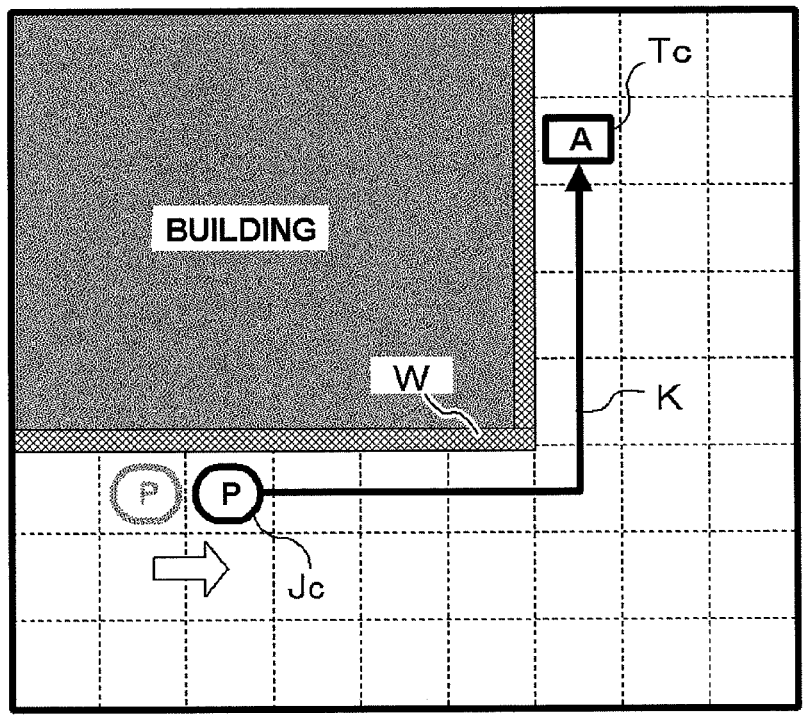
FIG. 9C is a diagram showing an example of a move of a player character and a displayed message accompanied thereby.
Figure 9D:
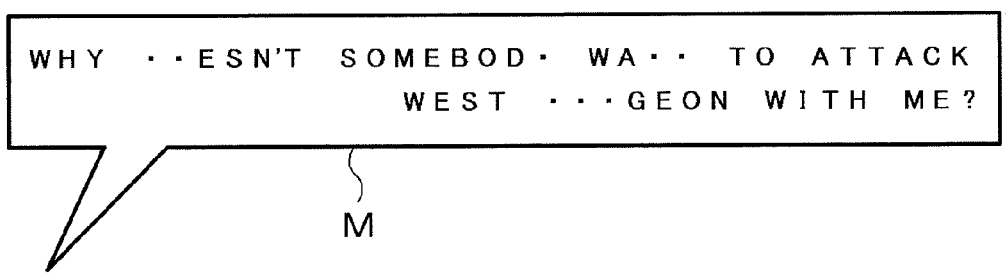
FIG. 9D is a diagram showing an example of a move of a player character and a displayed message accompanied thereby.

When the player character Jc further moves forward, the transmission path K shortens to a length 10 as shown in FIG. 9C, and the decay rate increases to 0.8 (a 20% decay). Accordingly, the number of masking characters decreases to 4, and as shown in FIG. 9D, the content of the displayed message M is almost apparent.

Hence, if the player feels no interest in the content of the message M at this instant, the player character Jc no longer needs to move forward but can move in a different direction and find still another character, etc.

Conversely, if the player feels interested in the content of the message M, the player can have the message with no masking characters displayed and continue the chat, by further moving the player character Jc forward, because such move shortens the transmission path K to a length 9 and increases the decay rate to 1.0.

In this way, at the boundary of the range wherein a chat is feasible, the message display process displays the message by substituting masking characters for a part of the message. The boundary of the range wherein a chat is feasible can have some expanse by the presence or absence of masking characters in the message, the ratio of the masking characters, etc., and the player can easily grasp the sense of range about the range wherein a chat is feasible.

(Another Embodiment)

The embodiment described above has explained an example case of substituting masking characters for random part of a message. Hence, the message with substitutive masking characters might read in a different inappropriate meaning that is not intended.

That is, reading a message by skipping masking characters might accidentally form a malign letter string of a forbidden word (such as a word that is not suitable as broadcast terminology, a discriminatory word, etc.).

Hence, the suitability of the message including substitutive masking characters may be verified.

Figure 10:
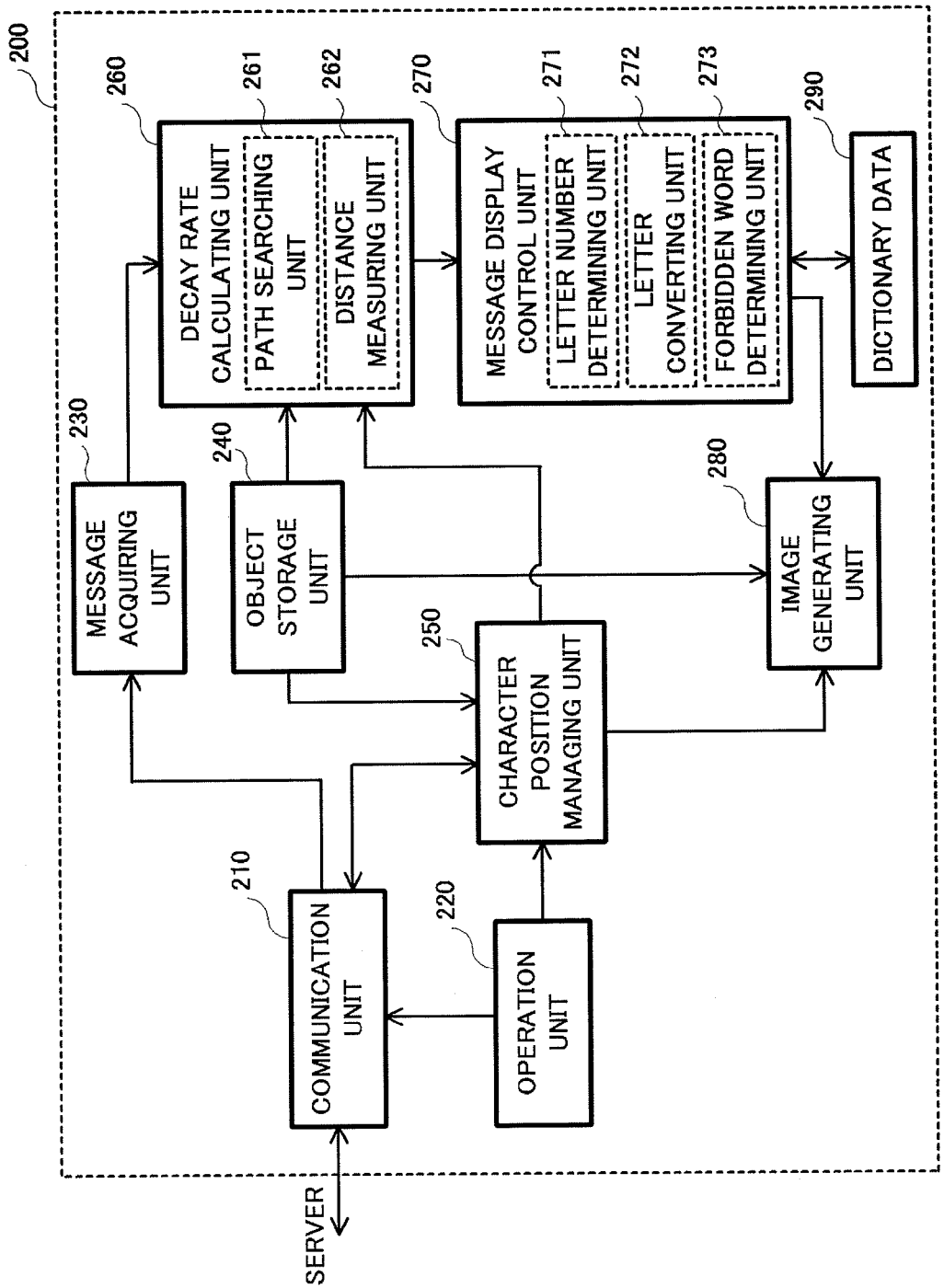
FIG. 10 is a block diagram showing a schematic configuration of a message display device according to another embodiment of the present invention.
Figure 11A:
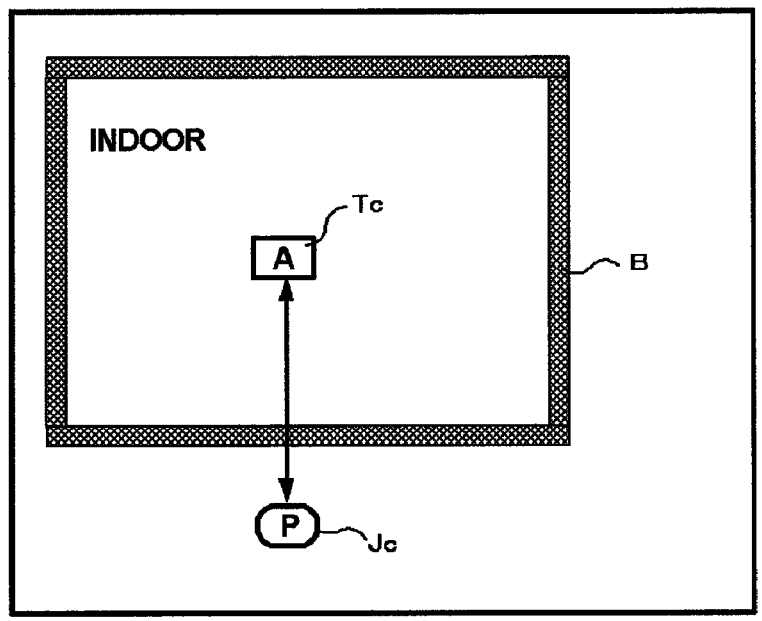
FIG. 11A is a schematic diagram for explaining a problem in a conventional game device.
Figure 11B:
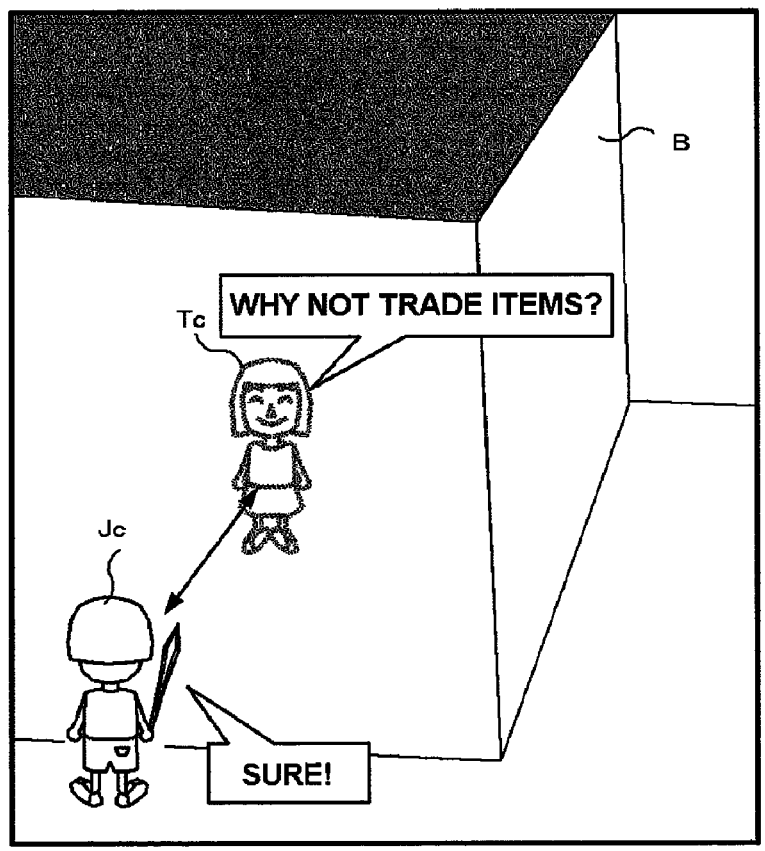
FIG. 11B is a schematic diagram for explaining a problem in a conventional game device.
Figure 11C:
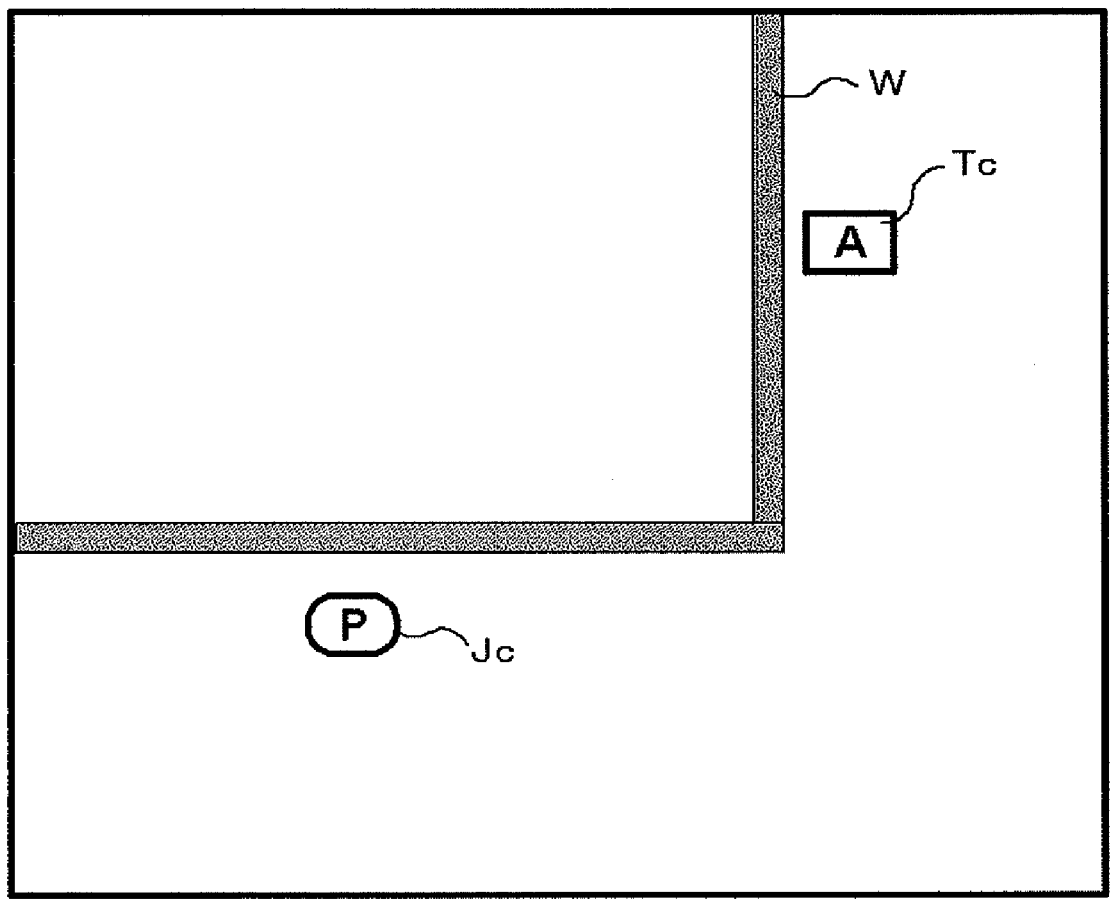
FIG. 11C is a schematic diagram for explaining a problem in a conventional game device

For example, as shown in FIG. 10, the message display device 200 further includes dictionary data 290 that stores various forbidden words in a searchable form. The message display control unit 270 further includes a forbidden word determining unit 273.

The forbidden word determining unit 273 verifies whether no forbidden word is included in a message resulting from substitution with masking characters, by using the dictionary data 290.

That is, the message display control unit 270 randomly selects letters to be substituted for by masking characters, generates a letter string from which the selected letters are removed, and by the forbidden word determining unit 273, determines whether each forbidden word can be searched out from the letter string.

In a case where any forbidden word is searched out, the message display control unit 270 redoes random selecting of letters to be substituted for by masking characters, generates a letter string from which the selected letters are removed, and again subjects the letter string to the determination by the forbidden word determining unit 273.

When it is verified that the letter string does not include any of the forbidden words, the message display control unit 270 displays the message resulting from the substitution of the masking characters.

Hence, an unintended inappropriate message can be prevented from being displayed.

The embodiments described above have explained the case of displaying chat messages. However, messages that can be displayed are not limited to chat data but arbitrary.

For example, the present invention can likewise be applied to the display of messages on an electric bulletin board, an advertising sign, etc. in a virtual space, where masking characters will be partially substituted in accordance with the distance between the electric bulletin board and the player character, etc.

The present application claims priority to Japanese Patent Application No. 2006-283451, the content of which is incorporated herein in its entirety.

INDUSTRIAL APPLICABILITY

As explained above, according to the present invention, it is possible to provide a game device, a method of displaying message, an information recording medium, and a program that are suitable for providing ease of grasping a range wherein a chat is feasible, in displaying messages exchanged by the chat.

The invention claimed is:

1. A game device that displays a message uttered by a character of a plurality of characters being disposed in a common virtual space and including a player character operated by a player, the game device comprising:
    an acquiring unit that acquires a message uttered by another character;
    a calculating unit that calculates a decay rate of the message based on a positional relationship between the another character, which has uttered the message, and the player character; and
    a display control unit that displays the message so that a part of the message is converted into one or more masking characters based on the calculated decay rate.

2. The game device according to claim 1, further comprising:
    a path searching unit that searches out a transmission path between the another character and the player character, the transmission path bypassing an obstacle that exists between the another character and the player character; and
    a distance measuring unit that measures a distance between the characters, the distance being weighted in accordance with a portion at which the searched-out transmission path bypasses the obstacle,
    wherein the calculating unit calculates the decay rate based on the distance between the characters measured by the distance measuring unit.

3. The game device according to claim 1,
    wherein the display control unit changes a ratio of masking characters of a substitution, in accordance with the decay rate calculated by the calculating unit.

4. The game device according to claim 1, further comprising:
    a letter number determining unit that determines a number of masking characters, in accordance with the decay rate calculated by the calculating unit and a number of letters included in the message acquired by the acquiring unit; and
    a letter converting unit that converts the determined number of letters selected at random from the message, to one or more masking characters, wherein the display control unit displays the message resulting from the conversion to one or more masking characters by the letter converting unit.

5. The game device according to claim 1, further comprising:
   a forbidden word determining unit that determines presence or absence of a predetermined forbidden word in the message resulting from the conversion to one or more masking characters,
   wherein the display control unit re-performs the conversion to one or more masking characters, when the forbidden word determining unit determines that there is a forbidden word.

6. A method of displaying a message for a game device that displays a message uttered by a character of a plurality of characters being disposed in a common virtual space and including a player character operated by a player, the method comprising:
   an acquiring step of acquiring a message uttered by another character;
   a calculating step of calculating a decay rate of the message based on a positional relationship between the another character which has uttered the message and the player character; and
   a display controlling step of displaying the message so that a part of the message is converted into one or more masking characters based on the calculated decay rate.

7. A non-transitory information recording medium storing a program that controls a computer that displays a message uttered by a character of a plurality of characters disposed in a common virtual space and including a player character operated by the player, the program controlling the computer to function as:
   an acquiring unit that acquires a message uttered by another character;
   a calculating unit that calculates a decay rate of the message based on a positional relationship between the another character, which has uttered the message, and the player character; and
   a display control unit that displays the message so that a part of the message is converted into one or more masking characters based on the calculated decay rate.

* * * * *